United States Patent [19]

Castro

[11] Patent Number: 4,859,478

[45] Date of Patent: Aug. 22, 1989

[54] PROCESS FOR MANUFACTURING RECONSTITUTED SQUID

[75] Inventor: Jose M. I. Castro, Vigo, Spain

[73] Assignee: Pescanova S.A., Vigo, Spain

[21] Appl. No.: 217,084

[22] Filed: Jul. 7, 1988

Related U.S. Application Data

[63] Continuation of Ser. No. 934,173, Nov. 20, 1986, abandoned.

[30] Foreign Application Priority Data

Feb. 24, 1986 [ES] Spain ......................... 552332

[51] Int. Cl.$^4$ ............................................ A33L 1/333
[52] U.S. Cl. ................................. 426/272; 426/289; 426/296; 426/302; 426/513; 426/643
[58] Field of Search .............. 426/272, 289, 296, 302, 426/643, 646, 513

[56] References Cited

U.S. PATENT DOCUMENTS

| | | | |
|---|---|---|---|
| 3,863,017 | 1/1975 | Yueh | 426/513 X |
| 4,396,634 | 8/1983 | Shenouda et al. | 426/513 X |
| 4,579,741 | 8/1986 | Hanson et al. | 426/513 X |
| 4,622,234 | 11/1986 | Okada | 426/643 |

FOREIGN PATENT DOCUMENTS 0170460 10/1983 Japan ........................ 426/643

*Primary Examiner*—Arthur L. Corbin
*Attorney, Agent, or Firm*—Ladas & Parry

[57] ABSTRACT

This invention relates to a process for manufacturing reconstituted squid into ring shapes. The eatable parts of the cephalopods are washed and minced together at below zero temperatures. The pieces are then compacted into ring shaped molds. The product maintains its ring shape due to a high cohesion of the surface protein of each piece. The rings can then be dipped into batter or breadcrumbs and are then frozen.

14 Claims, No Drawings

PROCESS FOR MANUFACTURING RECONSTITUTED SQUID

This is a continuation of co-pending application, now abandoned, Ser. No. 934,173 filed on Nov. 20, 1987.

BACKGROUND OF THE INVENTION

The current concept of rings dipped in batter or breadcrumbs refers to cephalopod fragments that have been crosscut and compacted annularly, and completely covered with a paste coat of water, flour and other products, and coagulated upon frying.

SUMMARY OF THE INVENTION

The present invention refers to a process for the manufacture of reconstituted squid in the shape of rings by the agglomeration of small pieces of the different eatable parts of these molluscs.

Although squid is the main cephalopod used the rings can also be made from cuttlefish, sepia, etc. and, in general, from any kind of cephalopod.

Once the ring has been formed, it is dipped in batter or breadcrumbs and then fried.

When the rings are dipped in breadcrumbs, they are covered with grated bread and adhered by a binder, which will be discussed in detail later. It has now been discovered that the small pieces of the eatable parts of the cephalopod maintain annular forms when they are compacted into annular-shaped molds under certain conditions.

The amounts of Cephalopod and batter or breadcrumbs in the manufactured product is variable. The Cephalopod ring may make up 35 to 65% of the final manufactured product, or, the batter or breadcrumb material may constitute in the range of 35 to 65% of the final manufactured product.

DESCRIPTION OF THE PREFERRED EMBODIMENT

The process of making the cephalopod rings is as follows:

Preparing the Cephalopod in question, by removing the non-eatable parts (viscera, eyes, beak, shell). The mantle skin can also be removed. The eatable parts (mantle, tentacles and wings) are then washed until a satisfactory cleaning is achieved.

Mincing of the different parts of the body of these cephalopods, namely the mantle, tentacles and wings and mixing them in different proportions depending on the kind of product to be achieved (e.g. 60% of mantle and 40% of wings). The mincing is preferably carried out in a cutter until all the pieces are less than or equal to 20 mm in length. The product temperature during the mincing process is in the range of $-10°$ C. to $-3°$ C.

The ring is formed with the use of a special machine, which applies pressure by a piston, compacts the pieces which were obtained during the mincing process in a hopper, and embeds them into deveral ring-shaped molds, of required shape and sizes.

The Cephalopod portions embedded in the ring-shaped mould are then unmolded by another piston which sets in the mould and which ejects them preferably with the help of pressurized air coming out through several of the holes of this ejecting piston. The formed ring then falls onto a conveying belt which conveys it to the following stages.

The ring shape is maintained through cohesion produced among the Cephalopod pieces when these pieces are at a below zero temperature. This is due to a high cohesion of the surface protein of each piece. The cohesion is sufficiently strong as to allow the ring shape to be kept despite the fact that the mould has some divisions which would favour deformation and that the ring subsequently goes through several transfers among conveying belts, which would also have the tendency to deform it.

During the process, compressing additives can be added at either the mincing stage or at an intermediate kneading stage by using a kneading machine under or without vacuum, depending on the cases.

According to the above, a mixture of 1 to 2% salt, 3 to 5% alginates and 5 to 10% ice can be added while the pieces are minced in the cutter. After the ring has been formed, it is then dipped into a 4 to 6% calcium chloride bath for about 15 to 25 seconds.

Pre-gelatinized starch, natural rubbers, carboxymethyl cellulose and gelatin can also be added during the mincing process or at an intermediate stage to give the final product an adequate consistency. The amount of these compressing substances which may be added ranges from 0.5% to 5%.

The consistency, texture and taste of the product varies depending on the variety of the process used.

Finally, the ring is dipped in batter or batter-bread crumbs. The ring can be powdered before it is dipped, with wheat flour, or it may not be, according to the kind of batter used.

The batter formula may vary depending on whether it is to be fried or baked. An example batter formula may be composed of 45–60% water, 35–40% wheat flours 2–4% of salt, 3–5% of gasifying substances and varying amounts of additives, such as emulsifying, thickening and colouring substances etc. and even wheat or other cereal flours. The ring is dipped into a batter bath and then goes on to the next stage.

Before rolling the rings in breadcrumbs, the ring is first dipped into a bath of variable composition, such as the one previously mentioned comprising 50% water, 25% flour, 25% starch and small percentages of salt, gasifying substances and other thickening products. It is then coated with different kinds of grated bread depending on the variety of taste and granulometry, of the manufactured product. The ring can then be either directly frozen or fried in oil in order to form a resistant and solid consistency.

The next stage of the process consists of frying the ring, already rolled in batter or breadcrumbs, by dipping it into oil (sunflower or olive oil or any other kind thereof) at 180°–190° C. for about 10–20 seconds. The batter coagulates during the frying process, and forms a solid and resistant consistency, which is characteristic of the product. The ring is then frozen through a rapid freezing process, preferably in a tunnel of C02 or in a tunnel of pressurized air, etc.

The product may be eaten after it has been fried or baked for a few minutes.

I claim:

1. A process for the manufacture of reconstituted squid shaped into rings which consists essentially of:
   a. washing eatable parts of a cephalopod
   b. mincing the eatable parts into pieces at a temperature of $-10°$ C. to $-3°$ C.

2. A process for the manufacture of reconstituted squid, according to claim 1, wherein compressing additives are added during the mincing stage.

3. A process for the manufacture of reconstituted squid, according to claim 2, wherein the additives are a mixture of 1-2% of salt, 3-5% of alginates and 5-10% of ice.

4. A process for the manufacture of reconstituted squid, according to claim 2, wherein compressing additives are pre-gelatinized starch, natural rubbers, carboxymethyl cellulose or gelatin.

5. A process for the manufacture of reconstituted squid, according to claim 1, wherein, before being dipped in batter, the ring is dipped in a 4-6% calcium chloride bath for about 15-25 seconds.

6. A process for the manufacture of reconstituted squid into ring-shapes according to claim 1 wherein the eatable parts of the Cephalopod are mantle, tentacles and wings.

7. A process for the manufacture of reconstituted squid into ring-shapes according to claim 1 wherein the mincing step is carried out in a cutter until all the pieces are less than or equal to 20 mm in length.

8. A process for the manufacture of reconstituted squid into ring-shapes according to claim 1 further comprising compacting the minced pieces in a hopper and embedding them into ring-shaped molds.

9. A process for the manufacture of reconstituted squid into ring-shapes according to claim 1 wherein formation of the ring involves the use of a machine applying pressure by a piston to compact the minced pieces and embed them into several ring-shaped molds.

10. A process for the manufacture of reconstituted squid into ring-shapes according to claim 1 wherein the ring shapes are removed from the molds by another piston which sets in the mold and ejects the rings by using pressurized air.

11. A process for the manufacture of reconstituted squid into ring shapes according to claim 1 wherein the ring retains its shape due a high cohesion of surface protein of each piece of the minced product.

12. A process for the manufacture of reconstituted squid shaped into rings consisting of the following steps:
   a. washing eatable parts of a cephalopod
   b. mincing the eatable parts into pieces at a temperature of $-10°$ C. to $-3°$ C.
   c. compacting the pieces in a ring shaped mold for producing a ring unified by mollusc protein cohesion at below zero temperatures to hold said ring shape;
   d. dipping the ring in batter or breadcrumbs, and then
   e. freezing the ring.

13. The process for the manufacture of reconstituted squid according to claim 12 wherein compressing additives are added during the mincing step.

14. The process for the manufacture of reconstituted squid according to claim 12 wherein, before being dipped in batter, the ring is dipped in a 4-6% calcium chloride bath for about 15-25 seconds.

* * * * *